June 24, 1941.	C. H. WIXOM	2,246,827
LIQUID FERTILIZER APPLICATOR
Filed Dec. 19, 1938
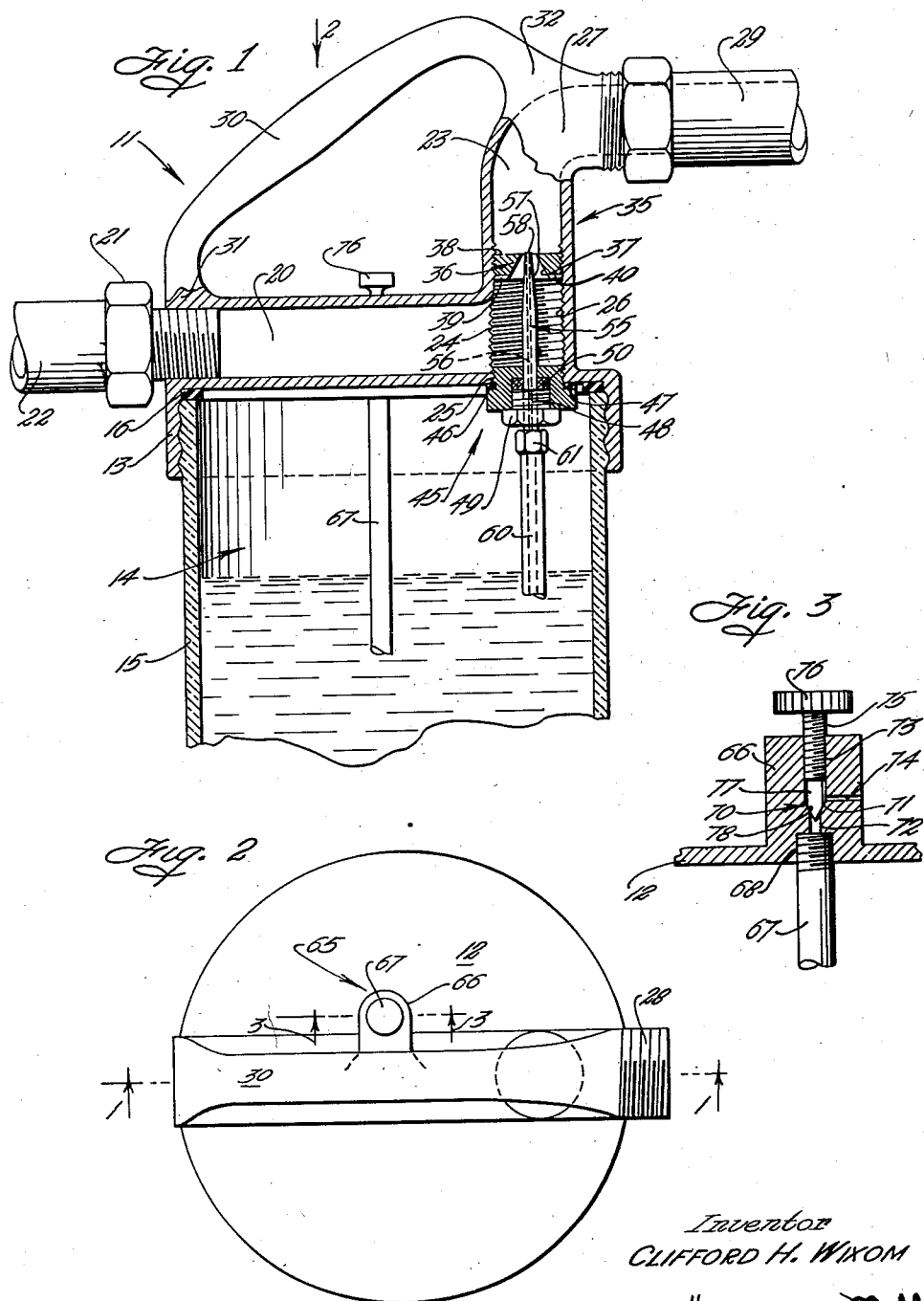
Inventor
CLIFFORD H. WIXOM
By Hazard and Miller
Attorneys Patented June 24, 1941

2,246,827

UNITED STATES PATENT OFFICE 2,246,827

LIQUID FERTILIZER APPLICATOR

Clifford H. Wixom, Fullerton, Calif.

Application December 19, 1938, Serial No. 246,624

3 Claims. (Cl. 299—84)

My invention relates to an appliance and the method of utilizing liquid fertilizer in which a stream of water as through a hose is utilized to discharge the liquid fertilizer. In my invention I employ an injector type of action in which the flow of the water through a connector in a hose or line of pipe is utilized to extract the liquid fertilizer from a suitable vessel or container due to the suction and partial vacuum created by the flow of the water through an orifice. The construction of the orifice and a jet nozzle connected to the vessel forms an injector type of device for elevating the liquid fertilizer which is maintained in the vessel located below the connector part of the implement in the path of the water. Considered more specifically, my invention includes a connector element which has attached thereto a supply and a discharge hose and is provided with an orifice producing a restriction in the flow of the water. The vessel to contain the liquid fertilizer is attached to the connector or intermediary apparatus and has a suction tube with a jet nozzle aligned with the orifice so that the suction created draws the liquid fertilizer into the discharge water to apply the liquid fertilizer in a dilute form with the water for irrigation.

Another feature of my invention includes a regulator of the supply of the liquid fertilizer, this being done by regulating the air flow into the receptacle or vessel, hence as the air must enter the vessel to replace the liquid fertilizer withdrawn by suction, an adjustment of the air flow controls the rate of discharge of the liquid fertilizer and hence the strength of the mixture of fertilizer and water applied to the various plants or crops. A further detailed feature of my invention includes a bubble type of air flow feeding so that the air entering the vessel bubbles through the liquid fertilizer, hence the user of the implement or applicator may readily change the rate of discharge of the liquid fertilizer.

A further detailed feature of my invention is in the construction of a cap with a connector element for a glass bottle or the like forming the liquid fertilizer container and on this cap I provide the water flow ducts or conduits, the supply conduit preferably extending horizontally above the cap and connecting to a vertical conduit with a threaded connection through the cap for attaching a siphoning tube. This has a discharge jet nozzle concentric with the discharge duct and such duct is provided with an orifice fitting which may be adjusted to secure the desired relationship of the jet nozzle for the liquid fertilizer and the orifice for the water flow. My invention contemplates forming the orifice tapered preferably having an even conical taper with the small end at the discharge of the water through the orifice, therefore by my construction I create a partial vacuum and a certain turbulence in the discharge duct on the discharge side of the orifice thereby producing the partial vacuum necessary to create the siphoning action of the withdrawal of the liquid fertilizer from the bottle. My invention contemplates a simple arrangement for adjusting the orifice fitting as by means of a screw driver and locating the tapered jet nozzle in the proper location. A further detailed feature of my invention relates to the use of a needle type of air control for admitting air to the vessel with an inlet air duct positioned to be readily closed by the finger so that the operator may obtain an additional regulation and temporarily stop the discharge of the liquid fertilizer.

My invention is illustrated in connection with the accompanying drawing; in which:

Fig. 1 is a vertical section taken substantially on the line 1—1 of Fig. 2 illustrating however the siphon tube in elevation and part of the handle and connecting hose in elevation.

Fig. 2 is a plan taken in the direction of the arrow 2 of Fig. 1 omitting however the hose attached to the device.

Fig. 3 is a detail vertical section on the line 3—3 of Fig. 2 in the direction of the arrows through the air inlet valve.

In my invention I employ a connector element designated 11 which includes a disk-like cap 12 having an internally threaded skirt or flange 13 to which is attached the liquid fertilizer vessel 14, such being illustrated as a cylindrical type of glass bottle 15 externally threaded adjacent the upper end for engaging the threaded skirt 13 and by means of a rubber gasket 16 or the like forming an air tight seal with the underside of the cap.

Formed as an integral element with the cap I provide a supply water duct 20 which is preferably circular in cross section and has provision for attaching a connector 21 to which is attached a supply hose 22. Extending upwardly from the cap there is a vertical discharge duct 23, the two ducts meeting at the opening 24. There is also a circular opening 25 through the cap concentric with the vertical duct 23. This vertical duct and the portion of the cap at the opening is internally threaded as indicated at 26. The discharge duct has a right angular elbow 27, a threaded projecting end 28 to which may be attached the discharge hose or pipe 29. For convenience of handling the device a handle 30 is formed as an integral part of the casting connecting at 31 with the intake end of the supply duct 20 and at 32 being connected to the elbow 27. This leaves a sufficient space under the handle and between the horizontal duct 20 and the vertical duct 23 for the fingers so that the operator or user of the device may readily carry this in one hand while he manipulates the hose with a spray fitting at the end to spray the various plants with the water and at the same time apply the fertilizer. It is preferable in most cases of course to apply the fertilizer to the ground instead of to the foliage of the plants. Of course in certain plants such as grass it is impossible to avoid applying the liquid fertilizer with the water directly to the foliage and the leaves.

The injector discharge assembly designated 35 includes an orifice fitting 36. This is illustrated as a cylindrical plug having a tapered orifice opening 37, such preferably being formed conical. The plug preferably has a discharge side 38 and an inlet side 39 parallel and transverse to the discharge duct 23. A screw driver kerf or slot 40 enables the orifice to be threaded through the opening 25 by means of the threads 26 to the desired position above the top of the intake or supply duct 20. This fitting is done before the vessel 14 is attached to the cap.

A plug 45 having a shoulder 46 is threaded upwardly through the cap in the opening 25 and may have a washer 47 at the shoulder forming a water tight seal. This plug has a threaded packing recess 48. A tubular packing gland nut 49 is threaded in the recess and compresses a packing 50 around the nozzle tube 55. This tube extends through an opening in the base of the plug 45 and also through a complementary opening in the gland nut 49. The nozzle tube preferably has a small bore duct 56 of constant diameter but at the upper end the outside has a taper as indicated at 57 to form a feather edge adjacent the jet outlet 58. The siphon tube 60 has a coupling connection 61 with the lower and projecting end of the jet nozzle tube. This siphon tube is of such length that its intake end is in close proximity to the bottom of the liquid fertilizer vessel 14.

The controlled air flow assembly 65 employs an air valve boss 66 formed as a casting integral with the cap 12 and the horizontal duct 20 and is positioned at one side of the duct as indicated at Fig. 2. An air tube 67 is threaded in a recess 68 in the boss 66 and extends downwardly in the vessel 14 having its discharge adjacent the bottom. The air valve 70 is of the needle valve type having a tapered seat 71 leading to a reduced bore 72 and having an upper threaded bore 73 with an intake small air duct 74 in communication with the outside air through the boss 66 and leading into the bore 73 slightly above the conical seat 71. A screw threaded stem 75 having a finger grip head 76 is threaded in the bore 73 and this has a reduced diameter plunger 77 with the needle point 78 at the bottom. The plunger portion is of slightly less diameter than the bore 73 to form an air space connecting with the inlet air duct 74. It will be apparent that by adjusting the needle valve a small and controllable space is produced between the needle point and the seat 71 for the inflow of air to replace the liquid fertilizer withdrawn in the operation of the device.

This operation is substantially as follows, however it is to be understood that for satisfactory results the discharge hose 29 should have a spray fitting or other discharge structure which does not develop much back pressure on the water flow. The water for operating the device is obtained from any usual supply. For garden use it may be connected to the ordinary garden hose and manifestly the quantity of flow of water may be readily controlled by a suitable valve or faucet. On account of the large opening 24 connecting the ducts 20 and 23 there is but little back pressure at this right angular turn so that the water entering the orifice fitting 36 is at substantially the pressure of the water in the hose connection 22 and the supply duct 20. Such water therefore is discharged through the orifice fitting much in the same manner as the water is discharged through an orifice except that the discharge duct 23 becomes completely filled with the flow of water and the siphoned liquid fertilizer.

To develop a proper siphoning action it is desirable that the jet discharge opening at 58 of the nozzle tube 55 be slightly above the inner plane face 36 of the nozzle fitting. The flow through the orifice develops a reduced pressure and a partial vacuum which causes an elevation of the liquid fertilizer from the vessel 14 upwardly through the siphon tube 60 and thence through the jet nozzle tube 55, the liquid being discharged in the nature of a fine jet into the moving water flow through the orifice fitting. Manifestly the liquid fertilizer can only be drawn out of the vessel as air is supplied to fill the space left by exhausting the liquid fertilizer. Therefore the control of the air supply valve 70 regulates the return of the inflow of air which enters in the form of bubbles and by the size and frequency of such bubbles apprises the operator of the rate of withdrawal of the liquid fertilizer. The operator may then judge as to whether or no there is too great of a portion or too little of a portion of the fertilizer to the amount of water being supplied and discharged through a sprinkler or the like. It is manifest that during the closing of the needle valve the inflow of air is more restricted, the size and frequency of the bubbles is reduced and therefore a smaller amount of fertilizer is withdrawn than when the valve is more open. Should the operator desire temporarily to stop the flow of fertilizer, he may place a finger tip over the open end of the inlet air duct 74 (note Fig. 3) and thus without making any adjustment of the air supply valve, the operator may completely stop the flow of fertilizer so long as the finger tip closes the duct 74. This allows readily moving from one position to another in spraying or irrigating without discharging the fertilizer.

In view of the fact that some of the liquid fertilizers cause a corrosion and deterioration of various metal structures contacted thereby, a feature of my invention resides in the facility for renewing and replacing the tapered nozzle assembly 55 and the orifice fitting 36. Moreover on account of the hose being attached to the threads 28 adjacent the elbow 27 a person may after detaching the hose inspect the position of the orifice fitting and the tapered nozzle. A small mirror of the dental type facilitates the inspection of these parts of the instrument. For most satisfactory operation the discharge end of the tapered discharge nozzle should be concentric with the conical discharge opening of the orifice fitting 36.

Various changes may be made in the details of the construction without departing from the spirit or scope of the invention as defined by the appended claims.

I claim:

1. In a liquid applicator a cap having means for attachment to an open topped vessel to form a closure therefor, an internally threaded duct extending directly from the cap and having an opening on at least one side, the cap having an opening leading to one end of the threaded duct, an externally threaded orifice fitting insertable through the opening in the cap and threaded into the threaded duct, a plug having an attachment to the opening of the cap, a siphon tube and a nozzle tube in direct alignment one with the other attached to the plug, the siphon tube extending into the vessel and the nozzle tube to the orifice fitting, the nozzle tube having a jet outlet located centrally as to the orifice fitting and a supply duct communicating with the open side of the said threaded duct, the threaded duct, orifice fitting and the nozzle tube providing for an annular stream of water for an injector discharge of the liquid supplied through the siphon tube.

2. In a liquid applicator a cap attached to the open top of a reservoir vessel and means to form a seal therewith combined with an internally threaded duct leading from the cap parallel to the axis of the vessel and having an inlet opening in at least one side, the cap having an opening concentric with the said threaded duct, an orifice fitting having external threads and insertable through the opening of the cap and fitted in the threaded duct beyond the side opening therein, such orifice fitting having a tapered orifice for flow of water, a supply duct attached to the cap and connected to the threaded duct at the side opening therein, a discharge duct continuing from the threaded duct beyond the orifice fitting, a screw threaded plug fitted in the opening of the cap, a siphon tube extending into said vessel and a nozzle tube in alignment one with the other attached to the plug, the nozzle tube having a jet outlet positioned centrally as to the orifice fitting whereby an annular stream of water surrounding the nozzle tube and discharging through the orifice fitting produces an injector discharge of the liquid drawn by suction through the siphon tube and the nozzle tube, such liquid mixing in said discharge duct with the water discharged through the orifice fitting.

3. In a liquid applicator, a cap for attachment to the open top of a reservoir vessel with means to form a seal, a siphon tube connected to the cap extending into the vessel, a liquid supply duct and a discharge duct, the combination of the discharge duct having internal threads, an orifice fitting having external threads threaded in those of the discharge duct, a nozzle tube connected in alignment with the siphon tube and extending into the orifice fitting, the orifice fitting having a conical opening with the base facing towards the siphon tube and the discharge end of the nozzle tube centered as to the apex of such opening, the discharge duct being cylindrical and the discharge side of the orifice fitting being transverse to such cylinder, the supply duct discharging in an annular stream through the orifice fitting around the nozzle tube and by an injector action adapted to discharge liquid from the reservoir and create a turbulence in the discharge duct beyond the orifice fitting to mix the liquid from the reservoir vessel with the supply liquid.

CLIFFORD H. WIXOM.